E. F. GRIFFIN.
AUTOMOBILE SIGNAL.
APPLICATION FILED JUNE 2, 1917.

1,351,642. Patented Aug. 31, 1920.
2 SHEETS—SHEET 1.

WITNESSES
C. F. Rudolph
D. B. Phillips

INVENTOR
E. F. Griffin,
BY Victor J. Evans
ATTORNEY

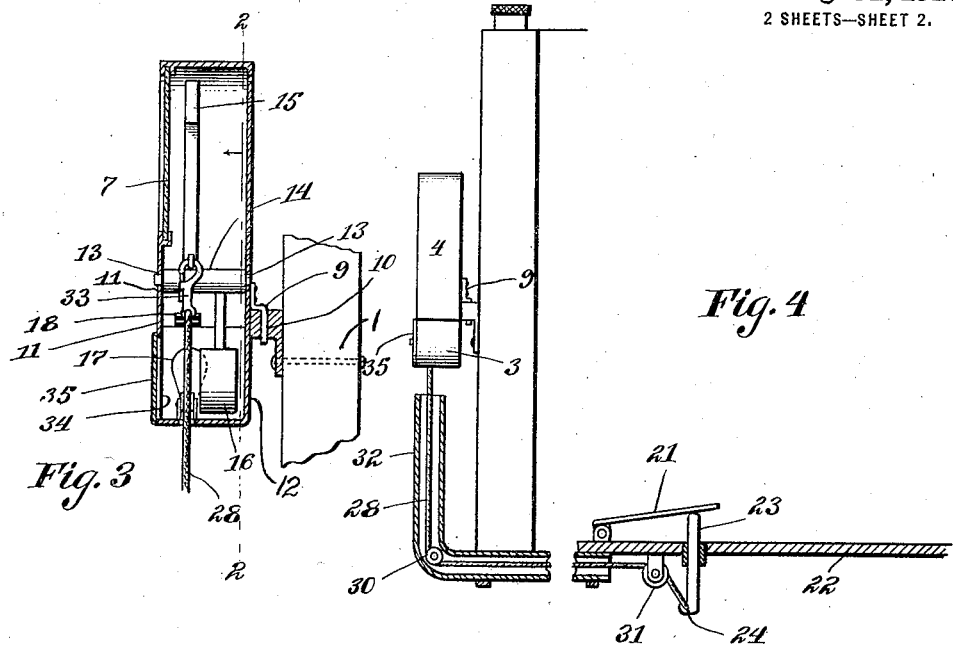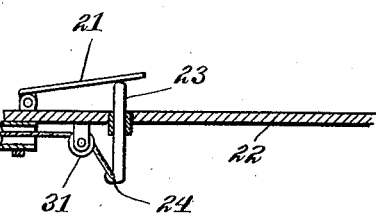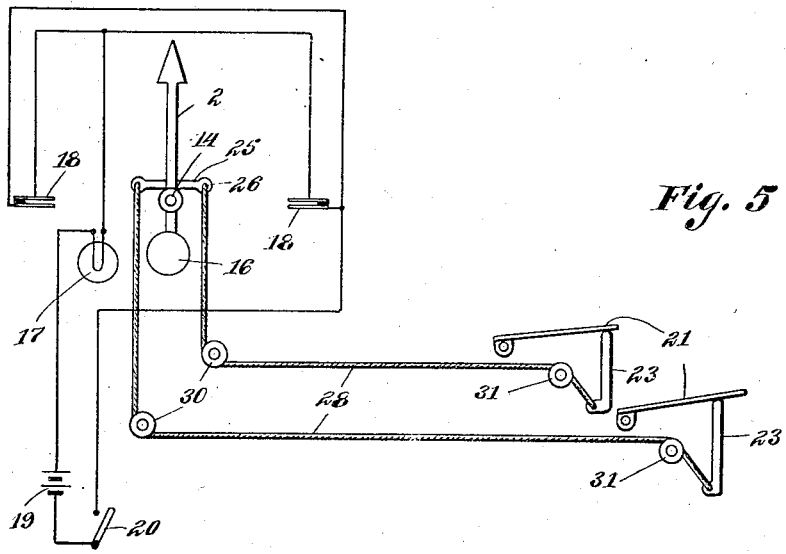

UNITED STATES PATENT OFFICE.

EDDIE FLOYD GRIFFIN, OF UNIONTOWN, PENNSYLVANIA.

AUTOMOBILE-SIGNAL.

1,351,642.

Specification of Letters Patent.    Patented Aug. 31, 1920.

Application filed June 2, 1917.    Serial No. 172,481.

*To all whom it may concern:*

Be it known that I, EDDIE F. GRIFFIN, a citizen of the United States, residing at Uniontown, in the county of Fayette and State of Pennsylvania, have invented new and useful Improvements in Automobile-Signals, of which the following is a specification.

This invention relates to improvements in vehicle directional indicators, referring more particularly to a signal for indicating proposed movements of an automobile; and contemplates the provision of an effective indicator adapted to be mounted upon the radiator of an automobile, and readily removable from the automobile when desired. Other objects are to provide a more convenient and efficient means for actuating the indicator, and to simplify and reduce the number of parts.

With these purposes in mind, and others which will hereinafter appear, I have embodied my invention in the form disclosed in the specification below, more particularly recited in the claim, and delineated in the drawings, in which—

Fig. 3 is a side view showing a vertical section through the housing.

Fig. 4 illustrates mechanism for actuating the indicator.

Fig. 5 shows diagrammatically the indicator and actuating mechanism.

Figure 1:
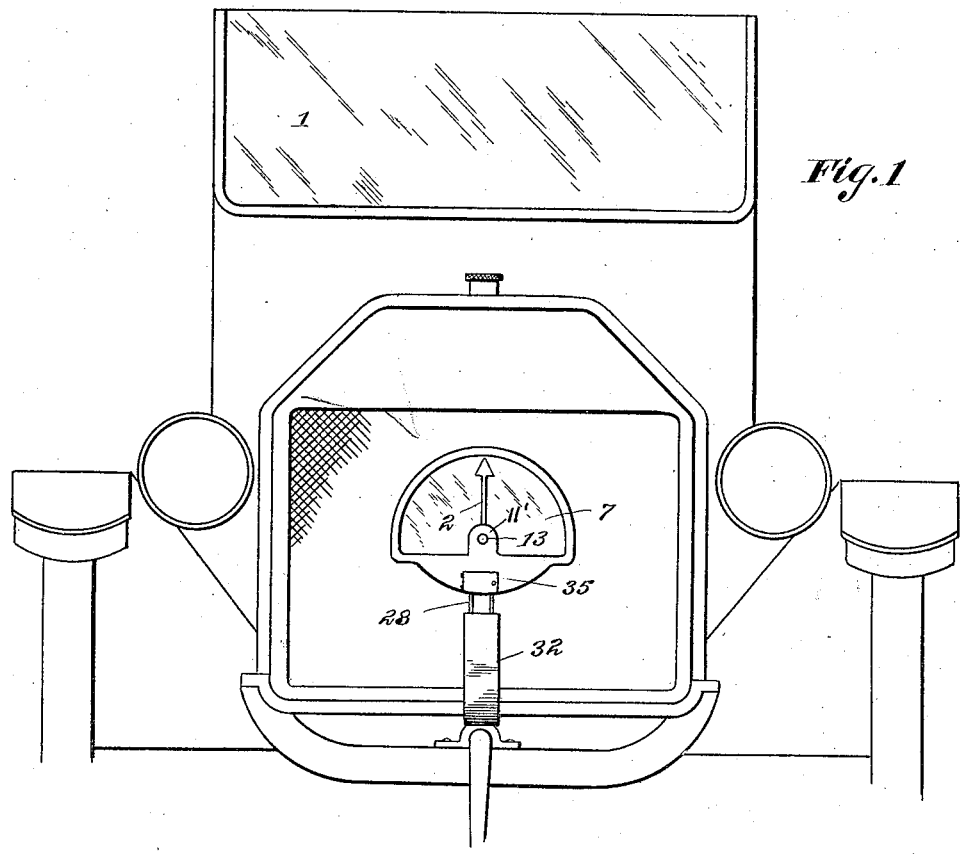
Figure 1 is a front elevation of an automobile with the indicator comprised in the present invention applied thereto.
Figure 2:
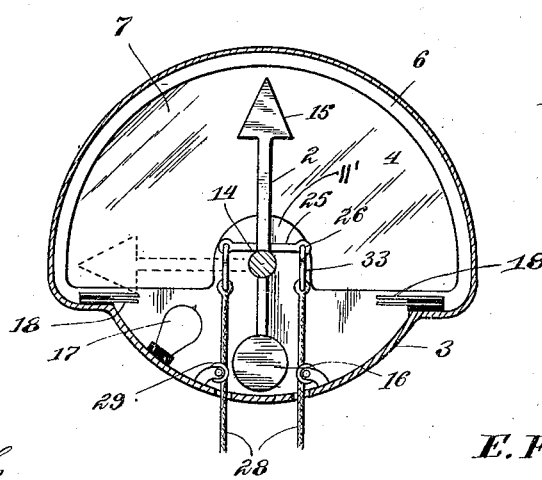
Fig. 2 is a front elevation of the indicator with the housing partially broken away to expose the mechanism.

Dealing more specifically with the drawings, the indicator is shown applied to the radiator of an automobile. The indicator element consists of a signal arm 2 formed and colored to readily attract attention and pivotally mounted for lateral swinging movement whereby proposed movements of the vehicle may be designated. For protecting and supporting the signal arm 2 and associated mechanism, I provide a casing or housing 3, whereof the upper part 4 may conveniently be of arcuate outline and concentrically disposed to the path of movement of the signal arm 2, while the lower part 15 may be of any shape suitable for accommodating the mechanism. The arcuate upper rim 6 of the housing is constructed of any convenient material, as wood or metal, and attached thereto in any suitable manner is a front wall 7 of glass exposing the upper part of the signal arm 2 to view. On either side of the rim 6 are secured lugs 9 adapted to detachably engage openings or slots 10 formed in the radiator frame 1, thereby sustaining the housing 3 and permitting ready removal by a single movement when desired.

The lower part of the housing 3 may be constructed from the same material utilized for the arcuate rim 6, and attached to the central upwardly extending part 11' of the front 11 and to the rear wall 12 are bearings 13 constituting journals for a spindle 14 secured intermediately of the ends of the signal arm 2 for rotative movement of the latter. The upper or visible part of the signal arm is in this instance formed to resemble an arrow 15. The lower part, or that below the spindle 14, may have any convenient form, and is preferably shorter than the arrow 15 and is terminally provided with a bob or weight 16 normally maintaining the arm in vertical position.

For effective operation of the indicator at night, a suitable electric lamp 17 is positioned within the housing 3, and in the path of movement of the arm 2 are contacts 18, whereby the lamp circuit will be closed to illuminate the arrow 15 in either operative position. Any convenient source of electricity, indicated in the drawings as a battery 19, may be utilized for supplying current to the lamp, a switch 20 being inserted in the circuit of the lamp for rendering the latter inoperative when desired, as during the day.

For movement of arm 2 foot pedals 21 are pivotally mounted on the floor 22 of the car for convenient operation by the driver. Beneath each foot pedal 21, and extending downwardly for longitudinal sliding movement through an opening formed in the floor 22 is a link 23 terminating below the floor 22 in an eye 24. The signal arm 2 is formed on each side immediately above the spindle 14 with a transverse extension 25 in the plane of movement of the arm, each extension 25 terminating in an eye 26 similar to the eye 24 on the links 23. Connected to each eye 26, and extending through an opening 27 formed in the housing 3, and terminally affixed to a respective eye 24 is a chain, cable, cord, or equivalent flexible element 28 whereby the signal arm 2 will be actuated to point to the left in the downward movement of one foot-pedal 21, and will be actuated to point to the right in the corresponding movement of the other pedal, the weight of the bob 16 serving to return the signal arm to normal position upon release of the pedals. Suitable guiding means are provided for each cable 28, such means comprising in the present instance a pulley 29 attached interiorly to the wall of the housing in the plane of movement of the arm 2, a pulley 30 secured to the frame of the car beneath the housing, and a pulley 31 screwed, bolted or otherwise mounted on the underside of the car floor in juxtaposition to the respective link 23. For protection of the cables, I may attach to the frame of the car and the radiator 1 tubes 32, preferably of metal, extending upwardly from the pulley 30 and having the cables 28 inserted therein for free sliding movement.

In the preferred form of my invention snap-hooks 33, or other readily detachable connections are employed between the eyes 26 and the respective cables 28, and the housing 3 is formed with a convenient opening 34, normally closed by a door 35, for insertion of the hand to disconnect the cables, whereupon the lugs 9 may be disengaged from the slots 10 and the housing bodily removed.

While I have here shown and described a preferred form of my invention for purposes of illustration, such embodiment is not to be interpreted as limiting the spirit of the invention, as I reserve the right to modification and variation within the scope of the accompanying claim.

I claim—

A device of the class described, comprising a housing, a transparent plate in the upper part thereof, a pivot pin supported by the lower front and rear walls of said housing, a signal arrow secured to said pin intermediate its ends, a counter weight on the lower end of said arrow for holding the head of the arrow opposite the transparent plate, a cross-arm on said arrow immediately above the pivot pin, cables connected with the ends of said arms and means in the lower part of the housing for illuminating the interior of the housing and the arrow.

In testimony whereof I affix my signature.

EDDIE FLOYD GRIFFIN.